United States Patent
Gajowniczek

(10) Patent No.: US 11,486,271 B1
(45) Date of Patent: Nov. 1, 2022

(54) ADJUSTABLE MOUNT FOR ENGINE ACCESSORY

(71) Applicant: PRATT & WHITNEY CANADA CORP., Longueuil (CA)

(72) Inventor: Krzysztof Gajowniczek, Rzeszow (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/502,763

(22) Filed: Oct. 15, 2021

(51) Int. Cl.
*F01D 25/28* (2006.01)
*F16B 5/02* (2006.01)

(52) U.S. Cl.
CPC ............ *F01D 25/28* (2013.01); *F16B 5/0233* (2013.01); *F05D 2220/32* (2013.01); *F05D 2230/60* (2013.01); *F05D 2260/30* (2013.01)

(58) Field of Classification Search
CPC .. F01D 25/28; F05D 2220/32; F05D 2230/60; F05D 2260/30; F02K 1/80
See application file for complete search history.

(56) References Cited

U.S. PATENT DOCUMENTS

| | | | | |
|---|---|---|---|---|
| 2,858,104 A | * | 10/1958 | Kelk | ........................ F01D 11/22 |
| | | | | 415/190 |
| 4,925,364 A | * | 5/1990 | Das | ........................ F16B 39/12 |
| | | | | 411/383 |
| 5,697,650 A | * | 12/1997 | Brown | ..................... F16L 41/12 |
| | | | | 411/537 |
| 7,329,066 B2 | | 2/2008 | Pineiros et al. | |
| 8,950,724 B2 | | 2/2015 | Hurst et al. | |
| 10,577,976 B2 | | 3/2020 | Izquierdo et al. | |
| 10,577,979 B2 | | 3/2020 | Davis et al. | |
| 10,746,212 B2 | * | 8/2020 | Burger | ..................... F16B 21/02 |
| 11,168,729 B2 | * | 11/2021 | Size, Jr. | ................. F16B 37/125 |
| 2007/0207012 A1 | * | 9/2007 | Lorenzo | ................ F16B 5/0233 |
| | | | | 411/546 |
| 2011/0008125 A1 | * | 1/2011 | Moon | ........................ F16B 5/02 |
| | | | | 411/108 |
| 2014/0230246 A1 | * | 8/2014 | McMahon | ............... F02K 1/822 |
| | | | | 411/84 |
| 2016/0201517 A1 | * | 7/2016 | McLaughlin | .......... F16B 41/002 |
| | | | | 29/889.22 |
| 2016/0222827 A1 | * | 8/2016 | Winn | ......................... F02C 7/12 |
| 2021/0010424 A1 | * | 1/2021 | West | ......................... F02C 7/20 |

* cited by examiner

*Primary Examiner* — Jesse S Bogue
(74) *Attorney, Agent, or Firm* — Norton Rose Fulbright Canada LLP

(57) ABSTRACT

An adjustable mount for an aircraft engine accessory. A first bracket adapted to be coupled to the engine accessory has a first bore with a first annular bushing with a threaded radially inner surface extending through the first bore. A second bracket operatively coupled to the engine at mounting location has a second bore with a second annular bushing with a threaded radially inner surface extending through the second bore. A threaded stud extends axially through the first and second bushings and is engaged with their threaded inner surfaces. Rotation of the first and/or second bushings varies the relative axial positions of the first and second bushings on the stud, thereby adjusting an axial gap between first and second brackets. First and second nuts fastened to first and second ends of the threaded stud axially retain the mount together with the axial gap between the first and second brackets fixed.

20 Claims, 13 Drawing Sheets

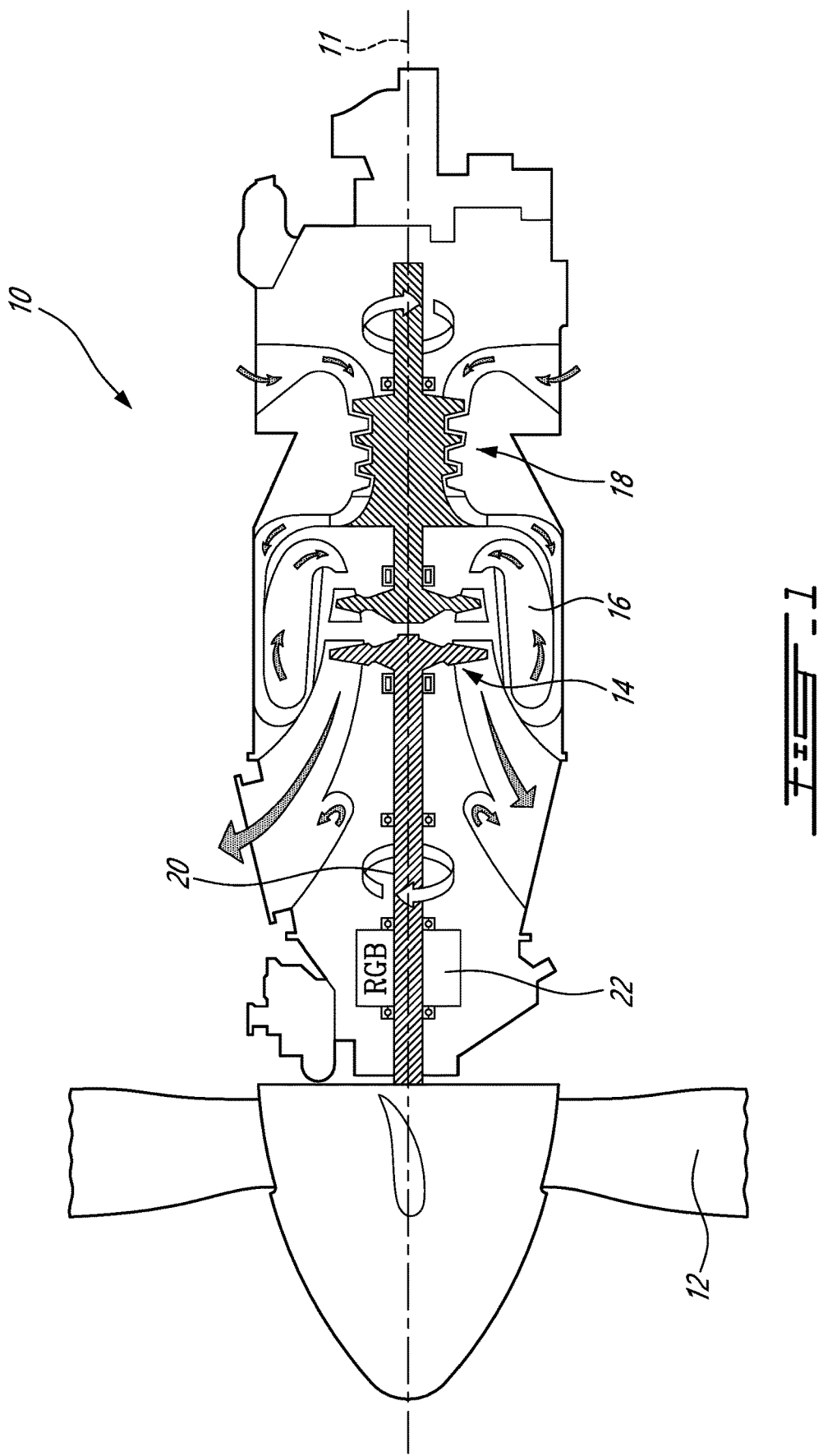

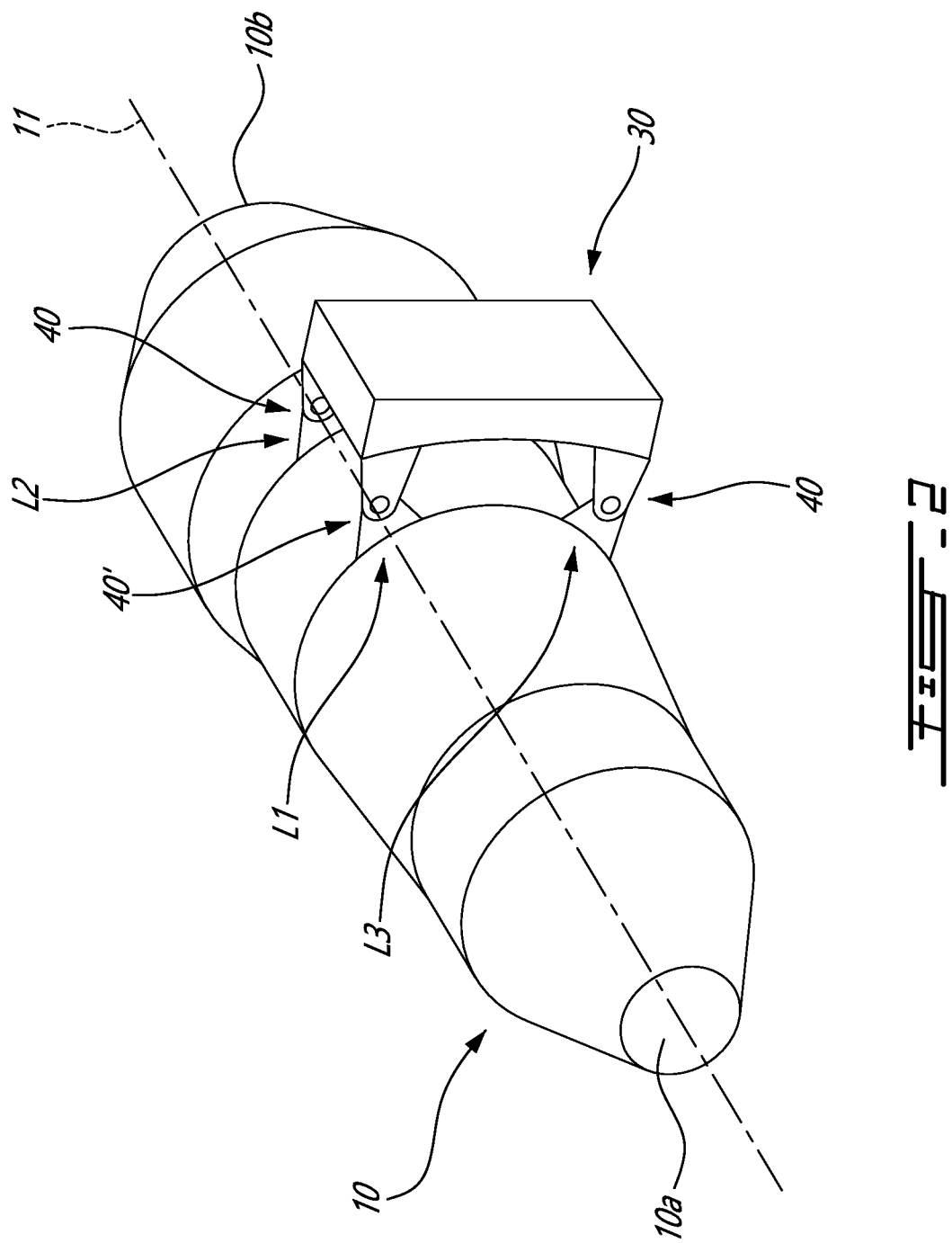

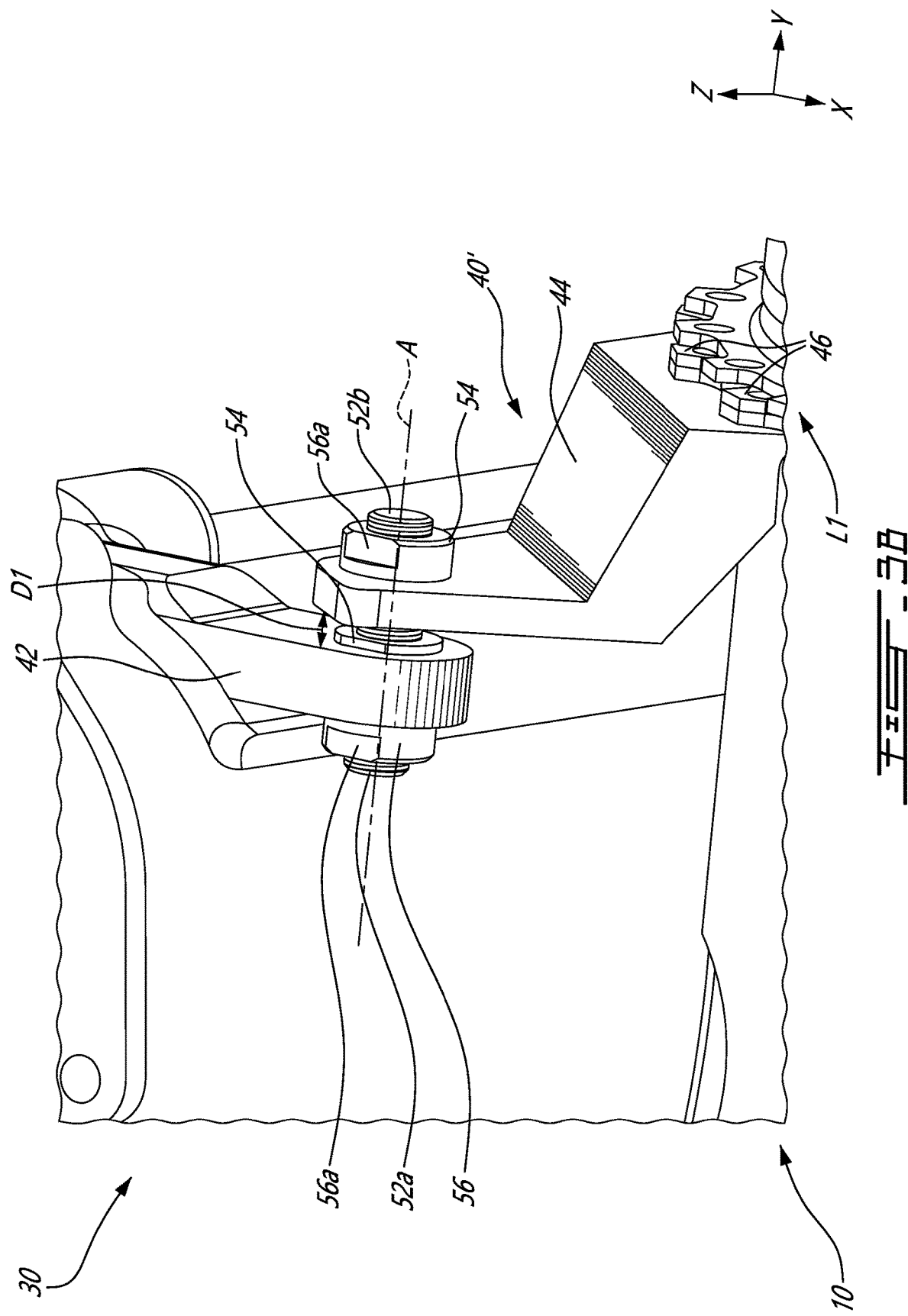

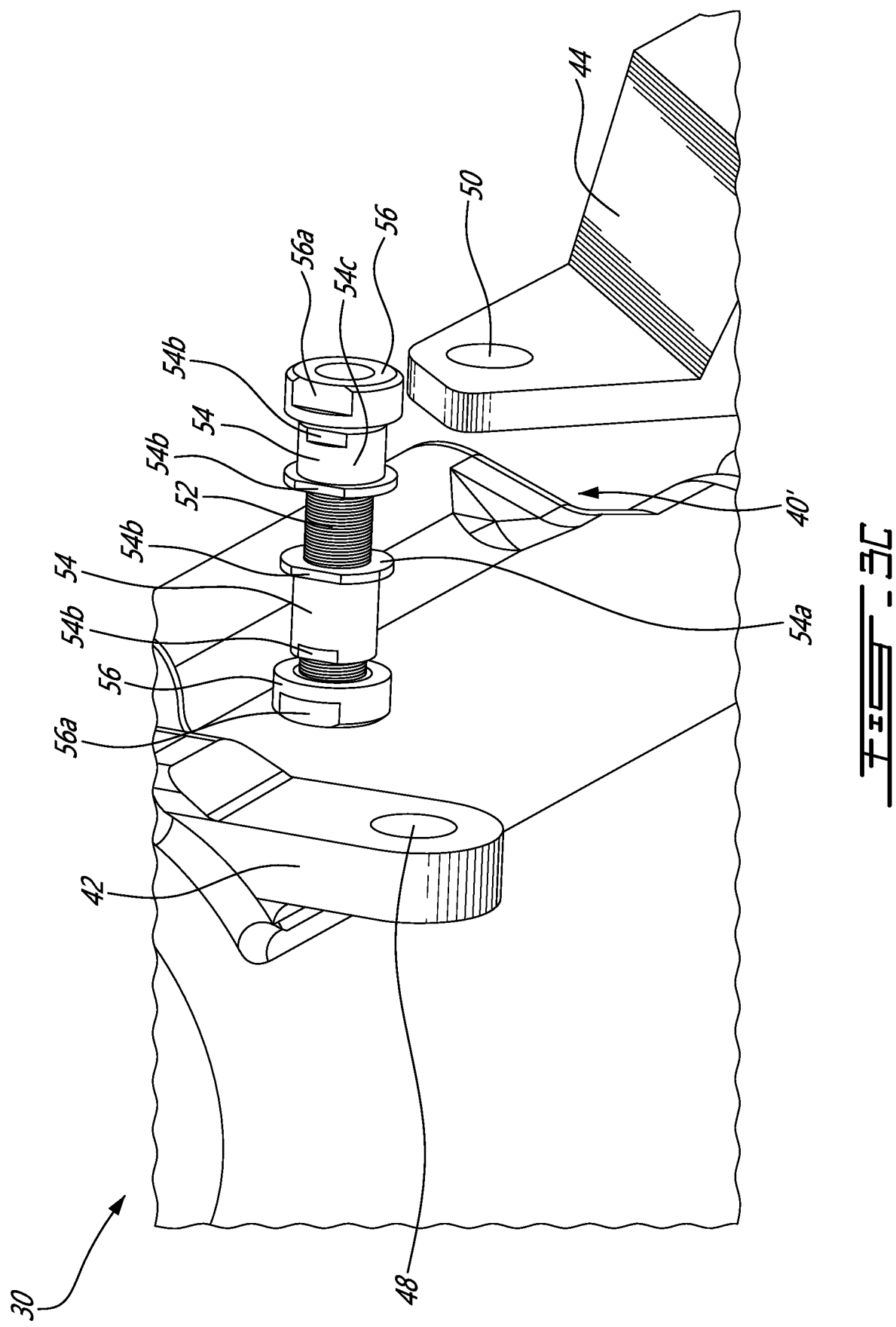

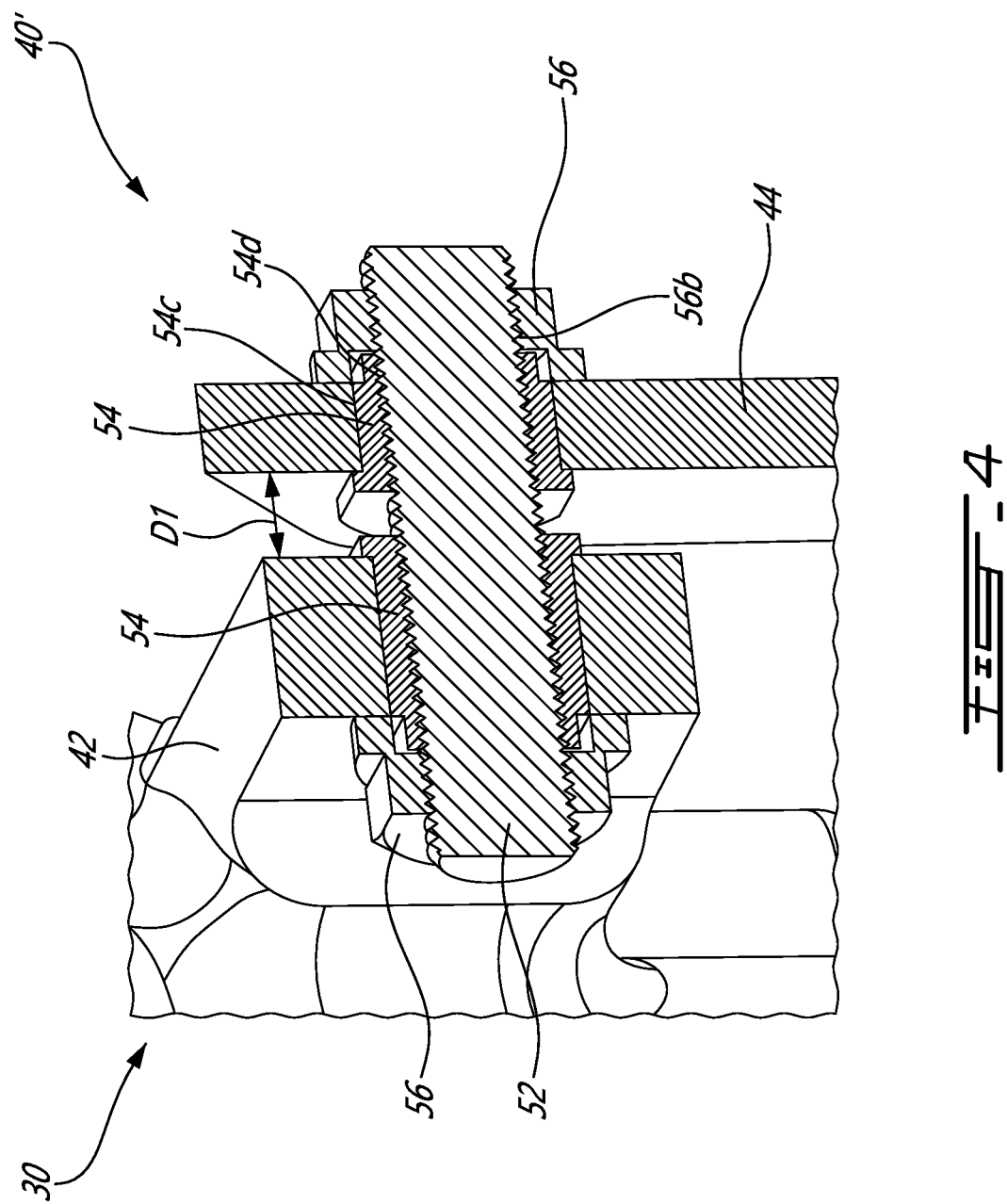

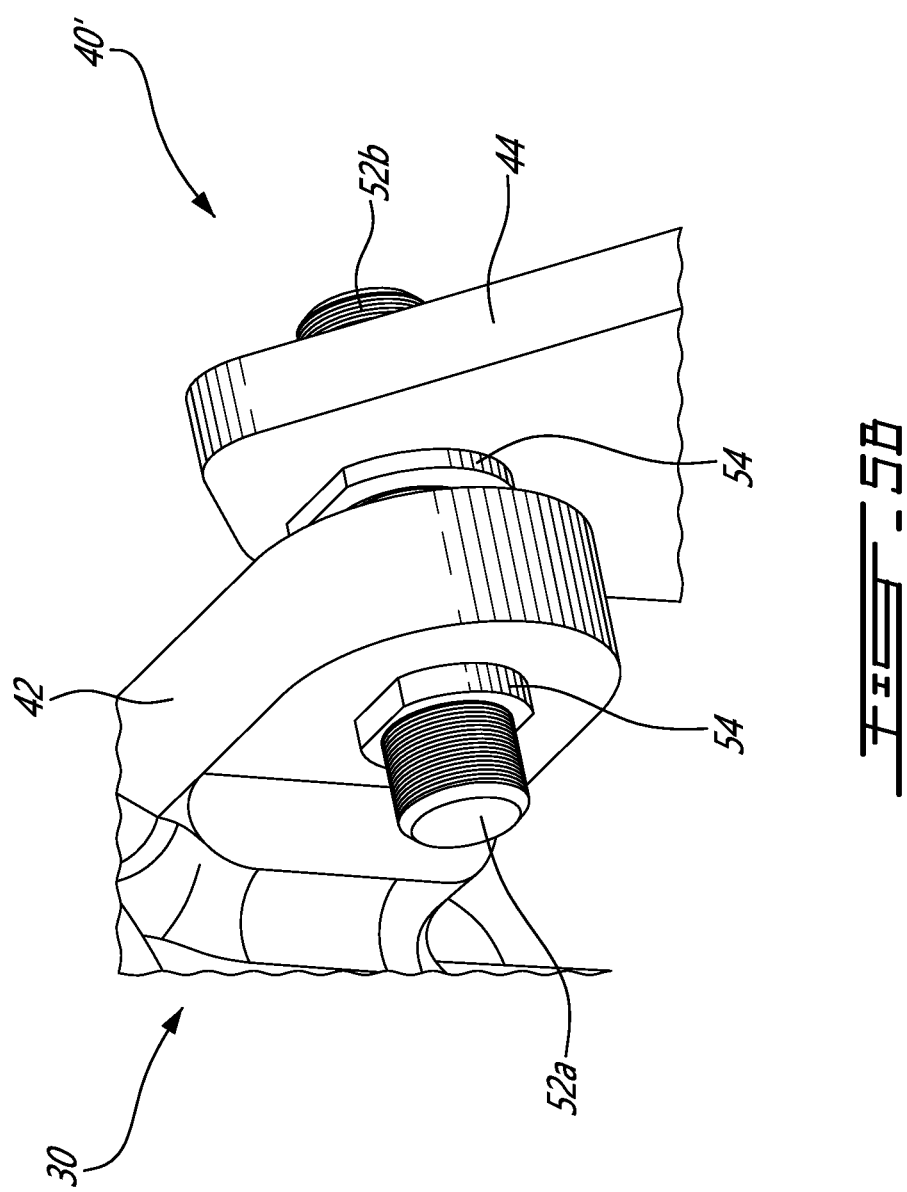

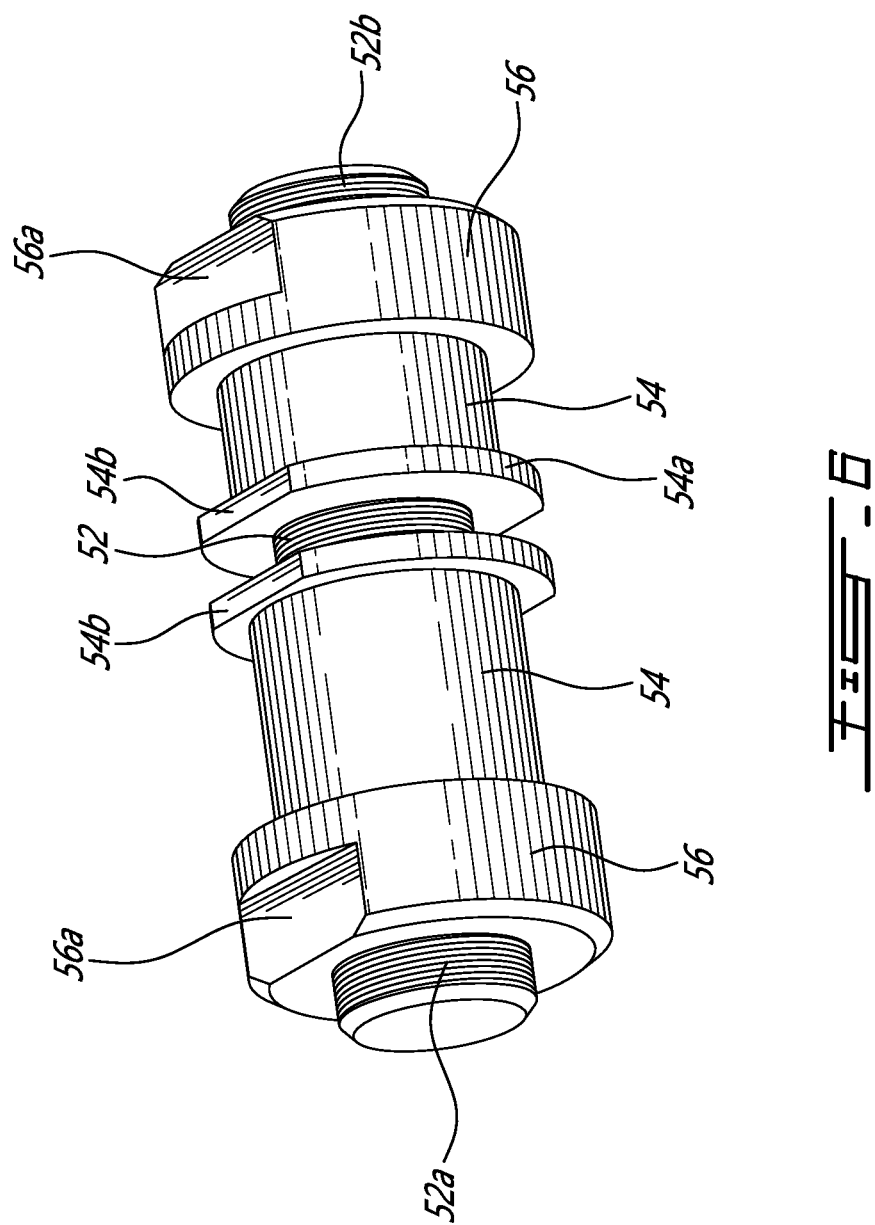

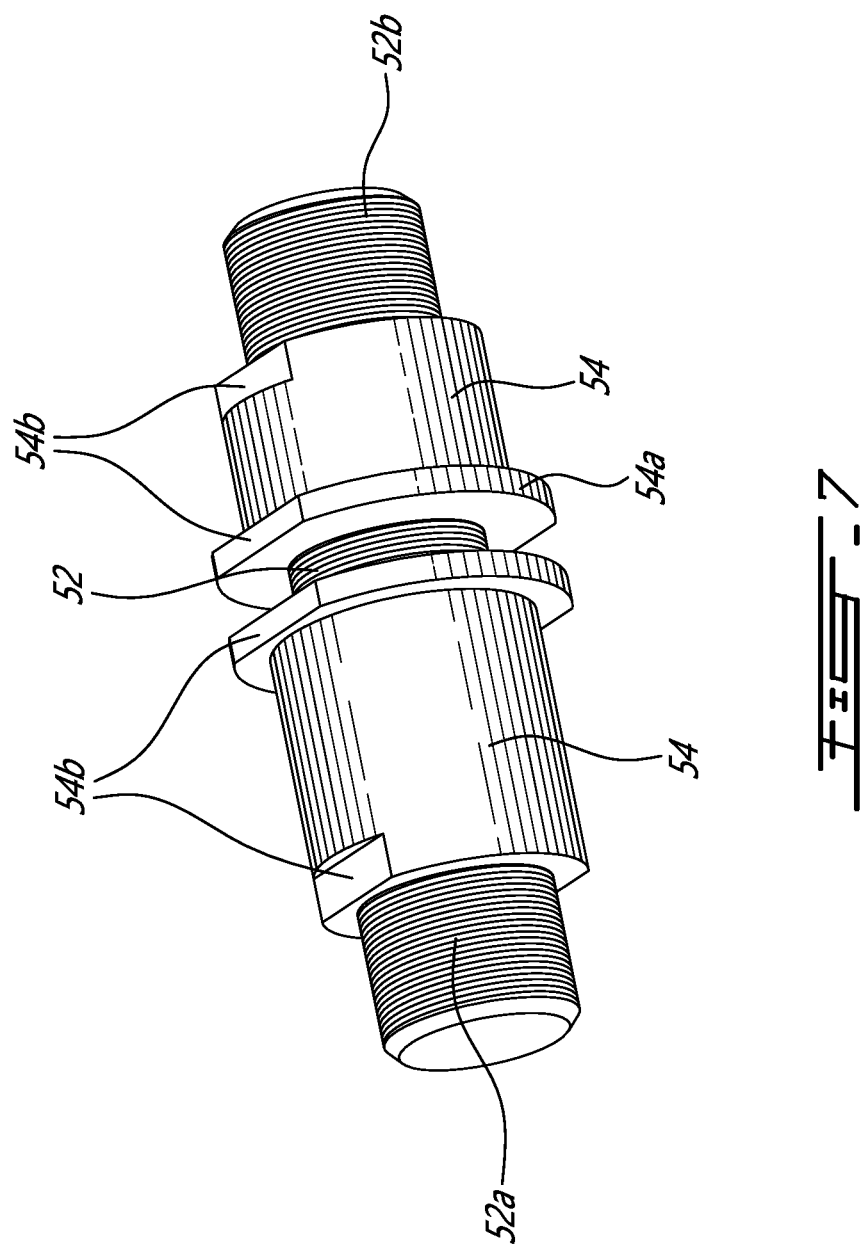

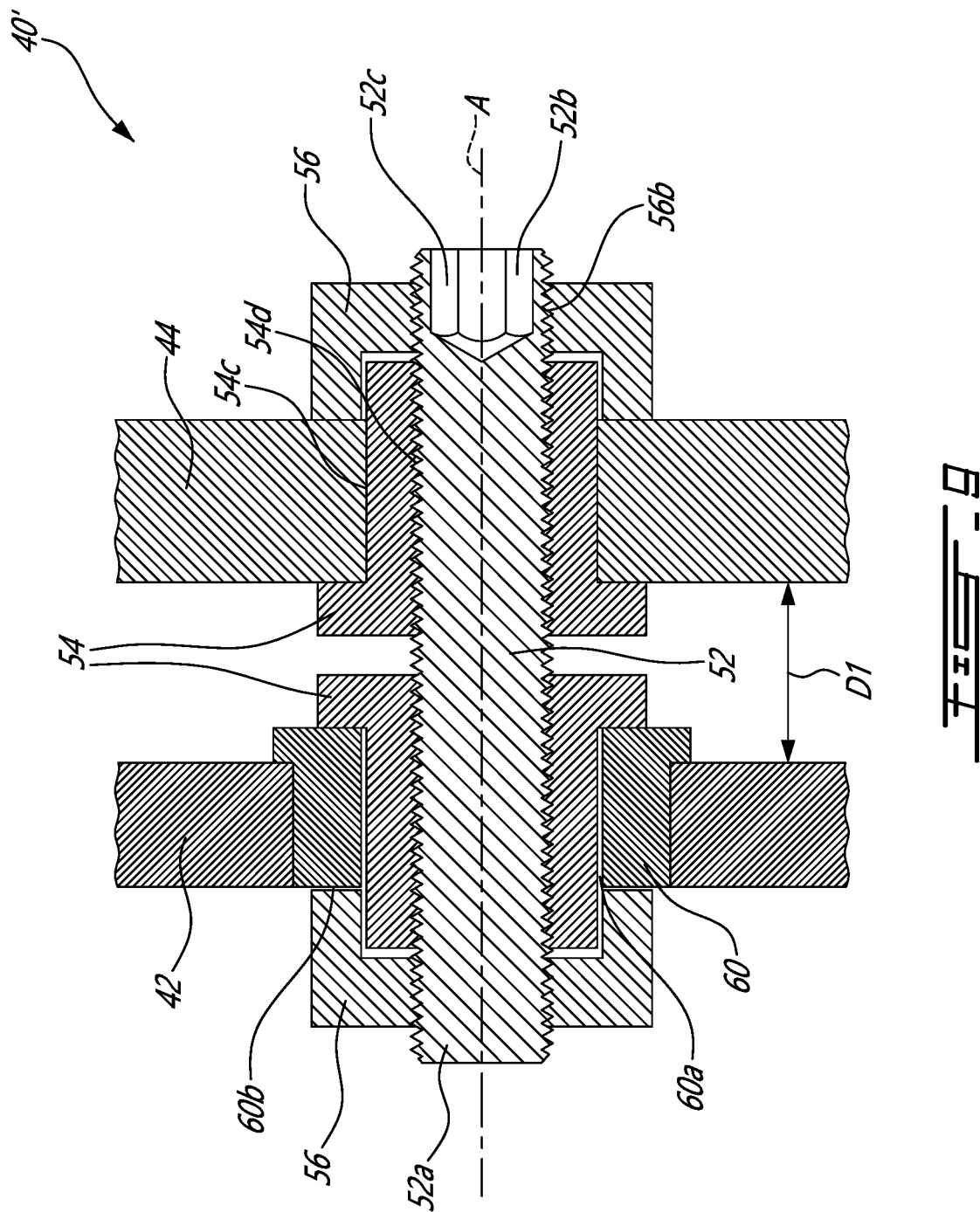

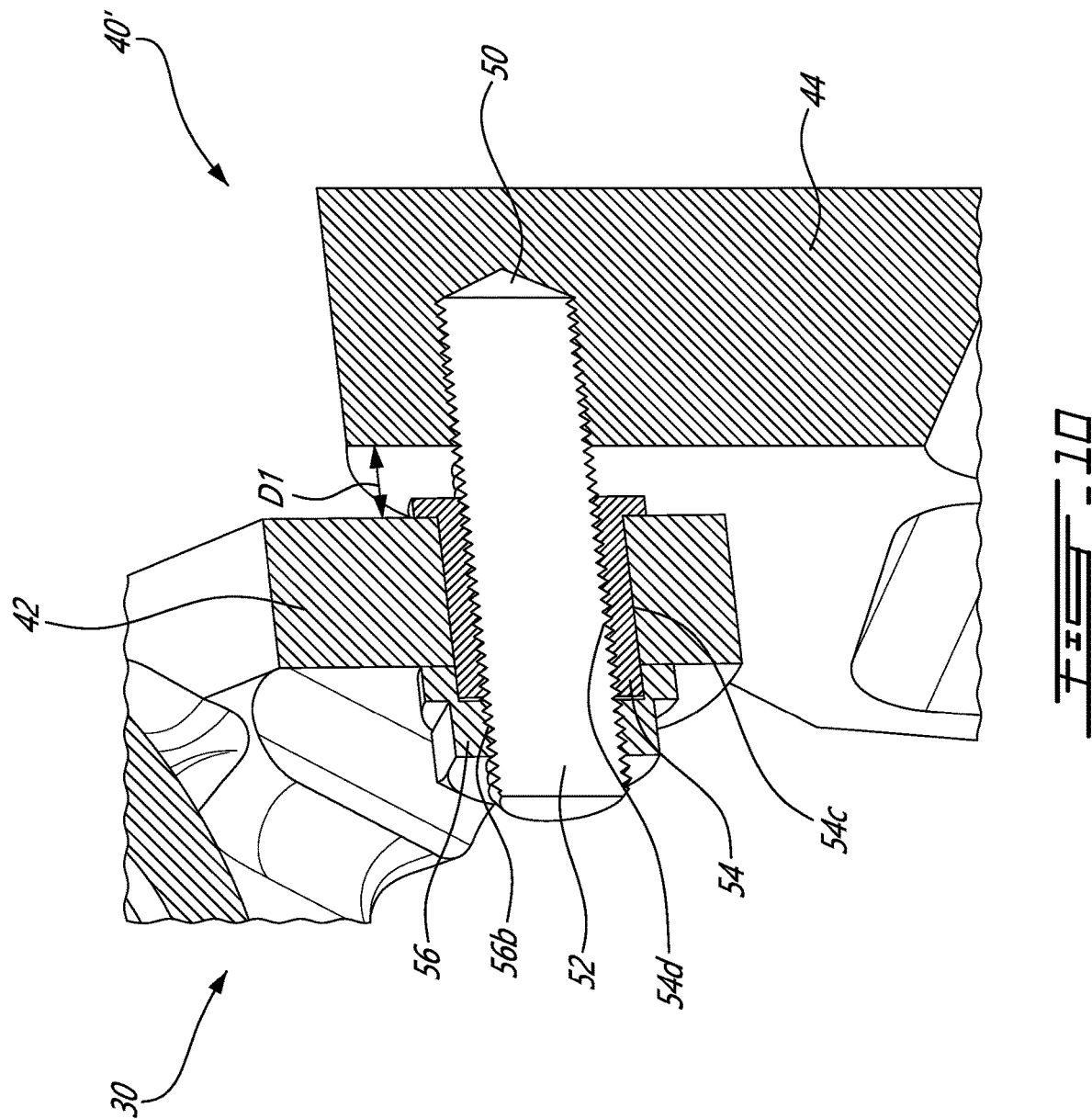

ADJUSTABLE MOUNT FOR ENGINE ACCESSORY

TECHNICAL FIELD

The disclosure relates generally to aircraft engines and, more particularly, to mounting brackets for aircraft engines.

BACKGROUND

Mounting brackets may be used to mount accessories to aircraft engines. Large and relatively heavy components, such as oil tanks, may require three mounting brackets positioned at three different mounting locations or attachment points. A typical mounting arrangement is known as a '3-2-1' arrangement, whereby the first attachment point provides constraint in three orthogonal directions, the second attachment point provides constraint in two orthogonal directions, and the third attachment point provides constraint in one orthogonal direction. This arrangement may reduce stresses caused by stack-up or mismatches during assembly and thermal expansion during operation, as well as other loads operational such as static, dynamic, inertial, and pressure-based loads. However, in certain situations it may also result in unsatisfactory dynamic behavior of the mounted accessory, for instance providing reduced stiffness that may lead to unwanted vibrations during operation. While adding constraints to one or more of the attachment points may increase the stiffness, the added constraint(s) may cause issues related to thermal expansion and stack-up after assembly. As such, improvements are desired.

SUMMARY

In one aspect, there is provided an adjustable mount for mounting an engine accessory to an aircraft engine at a mounting location thereon, the mount comprising: a first bracket adapted to be coupled to the engine accessory, the first bracket having a first bore disposed therethrough with a first annular bushing extending axially through the first bore, the first annular bushing having a radially outer surface rotatable within the first bore and a threaded radially inner surface; a second bracket operatively coupled to the engine at the mounting location, the second bracket having a second bore disposed therethrough with a second annular bushing extending through the second bore, the second annular bushing having a radially outer surface rotatable within the second bore and a threaded radially inner surface; a threaded stud extending axially through the first annular bushing and the second annular bushing, the threaded stud threadably engaged with the threaded radially inner surfaces of the first and second annular bushings, wherein rotation of the first annular bushing and/or the second annular bushing varies the relative axial positions of the first and second bushings on the threaded stud, and thereby adjusts an axial gap between the first and second brackets; and a first nut fastened to a first end of the threaded stud axially outward of the first bracket and a second nut fastened to a second end of the threaded stud axially outward of the second bracket, the first and second nuts axially retaining the adjustable mount together with the axial gap between the first and second brackets fixed.

In another aspect, there is provided a mounting system for mounting an engine accessory to an aircraft engine, comprising: a plurality of mounts coupling the engine accessory to respective mounting locations on the aircraft engine, at least one of the mounts including: a first bracket adapted to be coupled to the engine accessory, the first bracket having a first bore disposed therethrough with a first annular bushing extending axially through the first bore, the first annular bushing having a radially outer surface rotatable within the first bore and a threaded radially inner surface; a second bracket operatively coupled to the engine at a respective mounting location, the second bracket having a second bore disposed therethrough with a second annular bushing extending through the second bore, the second annular bushing having a radially outer surface rotatable within the second bore and a threaded radially inner surface; a threaded stud extending axially through the first annular bushing and the second annular bushing, the threaded stud threadably engaged with the threaded radially inner surfaces of the first and second annular bushings, wherein rotation of the first annular bushing and/or the second annular bushing varies the relative axial positions of the first and second bushings on the threaded stud, and therefore adjusts an axial gap between the first and second brackets; and a first nut fastened to a first end of the threaded stud axially outward of the first bracket and a second nut fastened to a second end of the threaded stud axially outward of the second bracket, the first and second nuts axially retaining the adjustable mount together.

In a further aspect, there is provided an adjustable mount for mounting an engine accessory to an aircraft engine at a mounting location thereon, the mount comprising: a first bracket adapted to be coupled to the engine accessory, the first bracket having a first bore disposed therethrough with a first annular bushing extending axially through the first bore, the first annular bushing having a radially outer surface rotatable within the first bore and a threaded radially inner surface; a second bracket operatively coupled to the engine at the mounting location, the second bracket having a second bore disposed at least partially therethrough; a threaded stud extending axially through the first annular bushing and the second bore, a first end of the threaded stud threadably engaged with the threaded radially inner surface of the first annular bushing and a second end of the threaded stud operatively coupled to the second bore, wherein rotation of the first annular bushing varies the relative axial position of the first bushing on the threaded stud, and thereby adjusts an axial gap between the first and second brackets; and a first nut fastened to the first end of the threaded stud axially outward of the first bracket, the first nut axially retaining the adjustable mount together with the axial gap between the first and second brackets fixed.

In a further aspect, there is provided a method for mounting an engine component to a mounting location of an engine, comprising: inserting a first annular bushing into a first bore in a first bracket operatively connected to the engine component; inserting a second annular bushing into a second bore in a second bracket operatively connected to the engine at the mounting location; threadably engaging a first end of a threaded stud with the first annular bushing and a second end of the threaded stud with the second annular bushing, thereby operatively coupling the first bracket to the second bracket; setting an axial distance between the first bracket and the second bracket by rotating at least one of the first annular bushing and the second annular bushing relative to the threaded stud to axially displace the first and second brackets relative to each other; and torqueing a first nut to the first end of the threaded stud and a second nut to the second end of the threaded stud to axially retain the first and second brackets together having the set axial distance therebetween.

The method as defined above and described herein may further include, in whole or in part, and in any combination, one or more of the following features and/or steps.

Rotating the at least one of the first annular bushing and the second annular bushing relative to the threaded stud may include engaging one or more seats on an outer circumference of at least one of the first annular bushing and the second annular bushing.

The method for mounting an engine component to a mounting location of an engine as described herein may further comprise aligning the first bracket and the second bracket by adjusting an angle of the threaded stud relative to a spherical bearing disposed in the first bracket.

The method for mounting an engine component to a mounting location of an engine as described herein may further comprise removably fastening the second bracket to the mounting location on the engine.

BRIEF DESCRIPTION OF THE DRAWINGS

Reference is now made to the accompanying figures in which:

FIG. 1 is a schematic cross sectional view of a gas turbine engine;

FIG. 2 is perspective view of an exemplary engine accessory mounted to an engine core;

FIGS. 3A-3C are top perspective, enlarged top perspective, and partially-exploded enlarged top perspective views, respectively, of the exemplary engine accessory mounted to the engine core using an adjustable mount;

FIG. 4 is a partial cross-sectional view of the adjustable mount of FIGS. 3A-3C;

FIGS. 5A and 5B are left and right perspective views, respectively of the adjustable mount of FIGS. 3A-4;

FIG. 6 is a perspective view of components of the adjustable mount of FIGS. 3A-5B;

FIG. 7 is a perspective view of components of the adjustable mount of FIGS. 3A-5B;

FIG. 9 is a schematic cross sectional view of an adjustable mount for mounting the engine accessory to the engine core; and FIG. 10 is a partial cross-sectional view of an adjustable mount for mounting the engine accessory to the engine core.

DETAILED DESCRIPTION

Figure 3A:
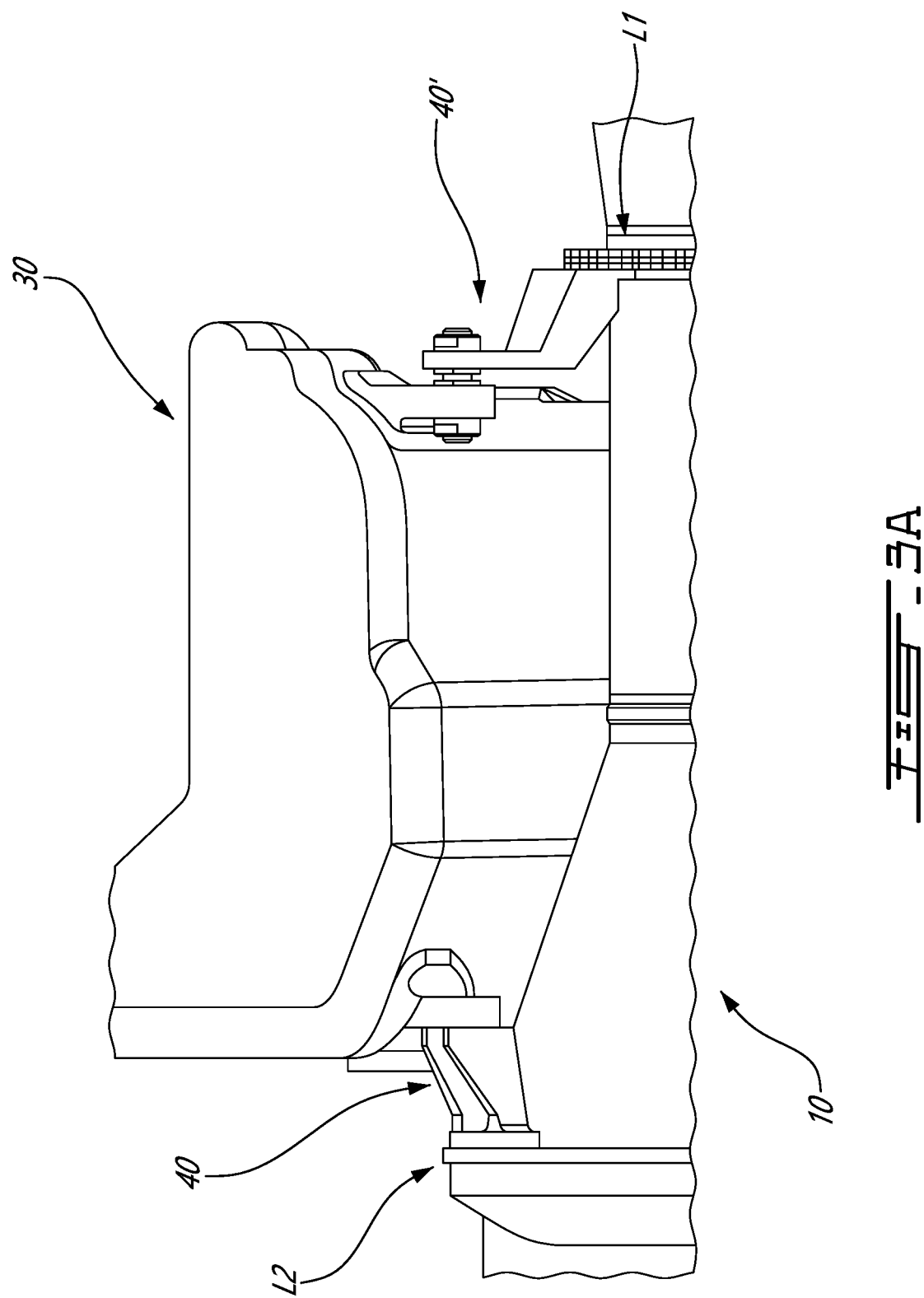
Figure 5A:
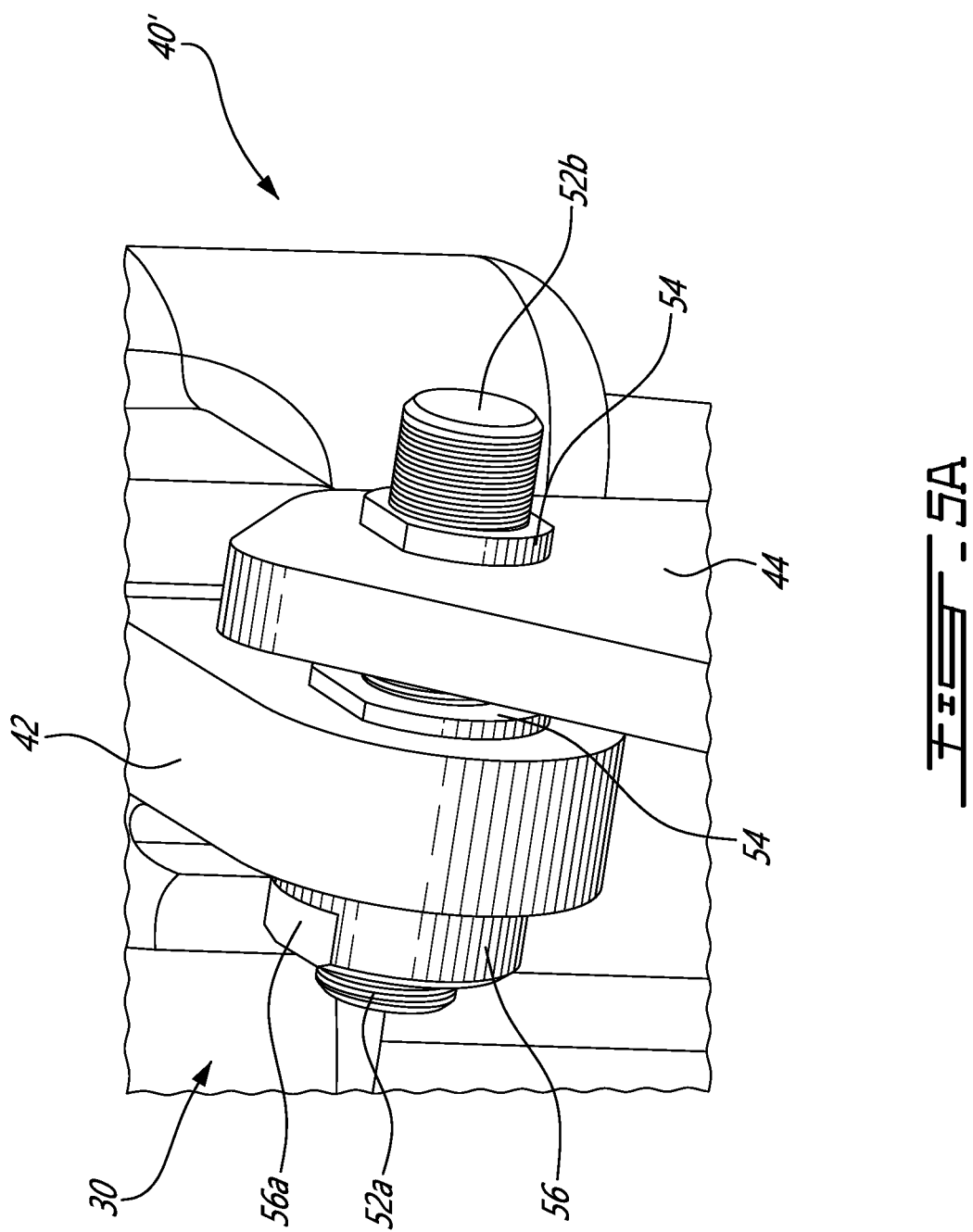

FIG. 1 illustrates an aircraft engine, for instance, a gas turbine engine 10 of a type preferably provided for use in subsonic flight. The exemplified engine 10 is depicted in FIG. 1 as a turboprop having a propeller 12. The engine 10 has, in serial flow communication, a compressor section 14 for pressurizing the air, a combustor 16 in which the compressed air is mixed with fuel and ignited for generating an annular stream of hot combustion gases, and a turbine section 18 for extracting energy from the combustion gases. The engine 10 has a shaft 20 drivingly engaged to the propeller 12 via a reduction gear box 22. Although FIG. 1 depicts engine 10 as a turboprop-type engine, the present disclosure is applicable to other engine types as well, for instance turboshaft and turbofan type engines.

Referring to FIG. 2, an engine accessory 30 is shown externally mounted to the core of engine 10 via mounts 40 and 40'. As will be discussed in further detail below, reference numeral 40' denotes an adjustable mount according to the present disclosure. The core of engine 10 is illustratively shown relative to a front end 10a and a rear end 10b of the engine core. Illustratively, the engine accessory 30 is an oil tank 30 externally mounted to the engine 10 via three mounts 40, 40' at three respective mounting locations L1, L2, L3 on the engine 10. In the depicted embodiment, the first mount 40' at the first mounting location L1 may be referred to as the top front mount, the second mount 40 at the second mounting location L2 may be referred to as the top rear mount, and the third mount 40 at the third mounting location L3 may be referred to as the bottom mount. Other types of engine accessories 30, for instance gearboxes, actuators, or heaters, externally mounted via other numbers of mounts 40 at different mounting locations on the engine 10 may be contemplated as well. Each mount 40 may constrain the movement between the engine accessory 30 and the engine 10 in a predefined number of degrees of freedom, ranging from one to three. Various mounts 40 may additionally prevent rotational movement about one or more predefined axes as well. In some embodiments, one or more of the mounts 40 are operable so that a distance between the engine 10 and the engine accessory 30 may be varied based on a variety of conditions, as will be discussed in further detail below.

Referring to FIGS. 3A-3C, an engine accessory 30, illustratively an oil tank, is shown to be externally mounted to the engine 10 via a mounting system comprising a plurality of mounts 40. In the depicted embodiment, one of the mounts at first mounting location L1 is an adjustable mount 40' operable to vary a distance D1 between the oil tank 30 and the engine 10. For instance, such distance may be adjusted to account for tolerances and/or or mismatches between the various components during assembly. While in the depicted embodiment only the mount 40' at the first mounting location L1 is an adjustable mount, in other embodiments an adjustable mount 40' may be positioned at one of the other mounting locations. In other embodiments, the engine accessory may be mounted via more than one adjustable mount 40'. Various combinations and arrangements may be contemplated.

Referring additionally to FIGS. 4-7, The adjustable mount 40' includes a first bracket 42 mounted to the oil tank 30 and a second bracket 44 mounted to the engine 10. In some embodiments, the second bracket 44 may be mounted directly to an external surface of the engine 10. In other cases, the second bracket 44 may be mounted to a mounting plate fixed to the engine. The second bracket 44 may be integrally formed with, fastenable to, or otherwise fixable to an external surface of the engine 10 (or a mounting plate disposed thereon). Other means for fixing the second bracket 44 to the engine 10 may be contemplated as well. The first bracket 42 may be integrally formed with the oil tank 30 (see FIGS. 3A-3C), or alternatively may be a separate component that is fixed to the oil tank 30. In various embodiments, the first bracket 42 and second bracket 44 may resemble flanges, lugs or other bracket-like structures. In the depicted embodiment, the second bracket 44 is removably mounted to the engine 10 via fasteners such as bolts insertable through apertures 46 while the first bracket 42 is integrally formed to the oil tank 30.

The first bracket 42 has a bore 48 disposed therethrough while the second bracket 44 has a bore 50 disposed therethrough (see FIG. 3C). As such, a linking component, illustratively a threaded stud 52 having a first end 52a insertable through bore 48 in the first bracket and a second end 52b is insertable through bore 50 in the second bracket 44. As will be discussed in further detail below, the threaded stud 52 is operable to adjustably retain the oil tank 30 to the engine 10. By 'adjustably retain', it is intended that the threaded stud 52 is operable to constrain the movement between the first bracket 42 and second bracket 44, but it capable of varying a distance D1 between the first bracket 42 and the second bracket 44.

In the depicted embodiment, the bushings 54 are internally threaded to allowed the fully threaded stud 52 to rotatably engage with and displace through the bushings 54. The stud 52 may also transfer loads between the first bracket 42 and the second bracket 44. The inserted depth of the first end 52a into bore 48 and/or the second end 52b into bore 50 may be varied, thereby adjusting the distance D1 between the first bracket 42 and the second bracket 44, i.e. the distance between the oil tank 30 and the engine 10. In other embodiments, only a portion of the stud 52 may be threaded, for instance the portions adjacent the first end 52a and the second end 52b. In such cases, the length of the stud 52 having said threaded portion may vary, for instance based on the required adjustability of distance D1 between the first bracket 42 and second bracket 44.

Various fasteners and retaining devices may be used to secure and adjust the positioning of the stud 52 within the bores 48, 50. Illustratively, before the stud 52 is installed, a first annular bushing 54 may be inserted into an inner side of the bore 48 in the first bracket 42, i.e. the same side from which the first end 52a of the stud 52 is inserted. A first nut 56 or other suitable fastener may then be fastened to the first end 52a protruding from the other side of the bore 48, i.e. an axially outer side of first bracket 42. Similarly, a second annular bushing 54 may be inserted into an inner side of the bore 50 in the second bracket 44, i.e. the same side from which the second end 52b of the stud 52 is inserted. A second nut 56 or other suitable fastener may then be fastened to the second end 52b protruding from the other side of the bore 50, i.e. an axially outer side of the second bracket 44. The bushings 54 and nuts 56 are sized and threaded to be engageable with the stud 52. As such, rotation of the various bushings 54 and nuts 56 may impart a corresponding rotation to the stud 52, causing the distance D1 between the first bracket 42 and second bracket 44 to increase or decrease depending on the direction of rotation.

Figure 8:
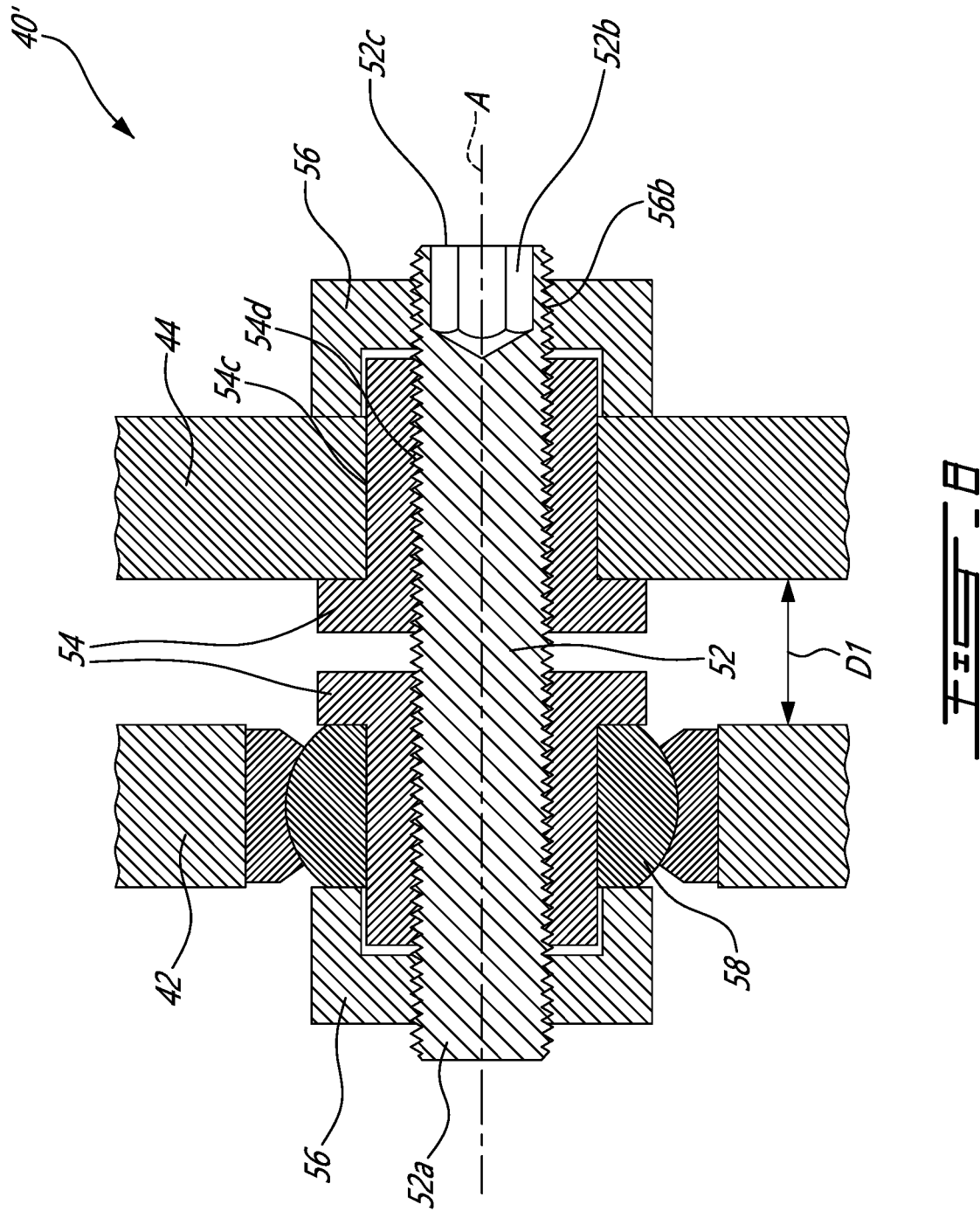
FIG. 8 is a schematic cross sectional view of an adjustable mount for mounting the engine accessory to the engine core.

The bushings 54 may include a collar or flange 54a for abutting against a surface of the first bracket 42 or second bracket 44 and include one or more seats 54b along an outer circumference thereof and/or on the flange 54a for engaging with a tool such as a wrench (not shown) for imparting the above-described rotation. Similarly, the nuts 56 may have seats 56a for engaging with a tool such as a wrench as well. Other means for rotating the bushings 54 and nuts 56 may be contemplated as well. In some embodiments, and as shown in FIG. 8, one or both of the first and second ends 52a, 52b of the stud 52 may include a stud seat 52c for imparting rotation to the stud 52, for instance via a wrench. The depicted annular bushings 54 have a radially outer surface 54c rotatable within the first bore 48 and the second bore 50, respectively. The bushings 54 further have a threaded radially inner surface 54d that are threadebly engageable with the threaded stud 52. Similarly, the depicted internal nuts 56 have internal threading 56b for threadably engaging with the ends of the threaded stud 52.

Referring to FIG. 3B, adjustable mount 40' may be operable to restrict motion between the engine 10 and accessory 30 in three degrees of freedom: in a first lateral direction (along the X axis), in a second lateral direction (along the Z axis) and in an axial direction (along the Y direction). The adjustability of mount 40', i.e. the ability to adjust distance D1 between the first bracket 42 and the second bracket 44, may be interpreted as a lengthening or shortening of the distance between the first bracket 42 and the second bracket 44 along the Y axis. The distance D1 may alternatively be defined relative to an axis A passing through a center of the stud 52. In the embodiment shown in FIG. 3B, the axis A is parallel to the Y axis, although in other cases, for instance in the embodiment shown in FIG. 8, the angle of axis A may vary relative to the Y axis.

Referring to FIG. 8, in some embodiments, the adjustable mount 40' is articulable about the A axis defined through the stud 52. In the depicted case, the first bracket 42 includes a spherical bearing 58 through which the bushing 54 receiving the first end 52a of the stud 52 is inserted, allowing the stud 52 to articulate once the mount 40' is assembled, for instance by adjusting the angle of the stud 52 relative to the spherical bearing 58. In other cases, the spherical bearing 58 may be included with the first bracket 42. Other means for allowing the mount 40' to articulate may be contemplated as well. If present, the spherical bearing 58 may allow for increased adjustability, for instance via angular adjustability of the spherical bearing 58. This may facilitate installation and reduce various stresses, for instance if the first mount 42 and second mount 44 are not perfectly aligned upon installation of the accessory 30 on the engine 10. The spherical bearing 58 may be used, for instance, in cases where the adjustable mount 40' constrains the component 30 translationally while allowing it to rotate freely.

An exemplary assembly process for mounting an engine accessory 30 to a mounting location L1 of an engine 10 via the herein described adjustable mount 40' will now be described. It is to be understood that the order of steps may be interchanged. A bushing 54 is inserted into a bore 48 in a first bracket 42 operatively connected to the accessory 30. By operatively connected, it is to be understood that the first bracket 42 is either integrated with or fastened to the component 30. An additional bushing 54 is inserted into a bore 50 in a second bracket 44 operatively connected to the engine 10. By operatively connected, it is to be understood that the second bracket 44 is either integrated with or fastened to the engine 10. A threaded stud 52 is then installed, with a first end 52a inserted into the bushing 54 in the first bracket 42 and the second end 52b inserted into the bushing 54 in the second bracket 44. A nut 56 is then mounted to the first end 52a of the stud 52 and torqued, for instance via a wrench engaging a seat 56a in the nut 56. The bushing 54 positioned at the second bracket 44 is then rotatably adjusted, for instance via a wrench engaging with a seat 54b to achieve a desired distance D1 between the first bracket 42 and the second bracket 44 relative to an axis A passing through the stud 52. An additional nut 56 is then mounted to the second end 52b of the stud and torqued. Various steps may be modified or replaced. For instance, the bushing 54 at the first bracket 42 may be used to adjust the distance D1, or a combination of the bushings at the first bracket 42 and the second bracket 44.

Various combinations of adjustable 40' and non-adjustable mounts 40 may be contemplated to mount the engine accessory 30 to the engine 10. In the embodiment shown in FIGS. 2-3C, mount 40' at location L1, i.e. the top front mount, is an adjustable mount constraining the movements of the engine accessory 30 to the engine 10 in three degrees of freedom (ex: horizontally, vertically and axially relative to central engine axis 11). Mount 40 at location L2, i.e. the top rear mount, is a non-adjustable mount constraining the movements of the engine accessory 30 relative to the engine 10 in three degrees of freedom (ex: horizontally, vertically and axially relative to central engine axis 11). Mount 40 at location L3, i.e. the bottom mount, is a non-adjustable mount constraining the movements of the engine accessory 30 relative to the engine 10 in one degree of freedom (ex: horizontally relative to the central engine axis 11). As such, the engine accessory 30 is mounted to the engine in a 3-3-1 configuration, and as such is over-constrained, which may prevent the engine accessory from vibrating due to its excessive size and/or weight. The adjustability of adjustable mount 40, i.e. the ability to vary distance D1 between the first bracket 42 and the second bracket 44, may mitigate potential issues relating to stack up, which may avoid any stresses once the accessory 30 is mounted to the engine 10. Other mounting configurations may be contemplated as well. For instance, a 3-2-2 configuration may be utilized, whereby mount 40' at location L2, i.e. the top rear mount, is an adjustable mount constraining the movements of the engine accessory 30 relative to the engine 10 in three degrees of freedom (ex: horizontally, vertically and axially relative to central engine axis 11, with the adjustable direction being axial), mount 40 at location L1, i.e. the top front mount, is a non-adjustable mount constraining the movements of the engine accessory 30 to the engine 10 in two degrees of freedom (ex: horizontally and vertically relative to central engine axis 11), and a mount 40 (not shown) at location L3, i.e. the bottom mount, is a non-adjustable adjustable mount constraining the movements of the engine accessory 30 relative to the engine 10 in two degrees of freedom (ex: horizontally and axially relative to the central engine axis 11). Other mounting configurations may be contemplated as well, for instance with one or more adjustable mounts 40'. The selection of the number and location of adjustable mounts 40' may depend, for instance, on the type of engine accessory 30 being mounted, the size and shape of the accessory 30, the weight of the component, etc.

Referring to FIG. 9, in some embodiments, the first bracket 42 includes a slide bushing 60 through which the bushing 54 receiving the first end 52a of the stud 52 is inserted. In such cases, due to constructional conditions, it may be beneficial to only transfer through the mount 40' translation forces and not bending loads. As such, the depicted slide bushing 60 may transfer all translational loads from the stud 52 to the first bracket 42. Due to adjustable clearances in both radial 60a and axial 60b directions, torsional loads in the depicted embodiment will not be transferred from the stud 52 to the first bracket 42. However, bending loads in both lateral directions relative to axis A will be transferred.

Referring to FIG. 10, in some embodiments, the second bracket 44 includes the second end 52b of the stud 52 received in the bore 50 in the second bracket 44 in a non-adjustable manner, with the adjustability of the adjustable mount 40' provided at the first bracket 42 as described above. For instance, the bore 50 may be correspondingly threaded to threaded stud 52 and receive the stud 52 in a rotational manner, as depicted in FIG. 10. In other embodiments, the second end 52b of the stud 52 may be welded, press-fit, brazed or otherwise operatively coupled, joined or integrated with the second bracket 44. The bore 50 in the second bracket 44 is thus not necessarily a through-bore in the depicted embodiment. In such embodiments, to adjust the distance D1 between the first bracket 42 and second bracket 44, the bushing 54 inserted in the bore 48 in the first bracket 42 may be rotated before the nut 56 on the opposite side of the first bracket 42 is torqued, as discussed above. Various combinations of the above-described features may be combined with the embodiment shown in FIG. 10.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An adjustable mount for mounting an engine accessory to an aircraft engine at a mounting location thereon, the mount comprising:
   a first bracket adapted to be coupled to the engine accessory, the first bracket having a first bore disposed therethrough with a first annular bushing extending axially through the first bore, the first annular bushing having a radially outer surface rotatable within the first bore and a threaded radially inner surface;
   a second bracket operatively coupled to the engine at the mounting location, the second bracket having a second bore disposed therethrough with a second annular bushing extending through the second bore, the second annular bushing having a radially outer surface rotatable within the second bore and a threaded radially inner surface;
   a threaded stud extending axially through the first annular bushing and the second annular bushing, the threaded stud threadably engaged with the threaded radially inner surfaces of the first and second annular bushings, wherein rotation of the first annular bushing and/or the second annular bushing varies the relative axial positions of the first and second bushings on the threaded stud, and thereby adjusts an axial gap between the first and second brackets; and
   a first nut fastened to a first end of the threaded stud axially outward of the first bracket and a second nut fastened to a second end of the threaded stud axially outward of the second bracket, the first and second nuts axially retaining the adjustable mount together with the axial gap between the first and second brackets fixed.

2. The adjustable mount as defined in claim 1, wherein the first bracket includes a spherical bearing disposed about the bore in the first bracket such that the threaded stud extending axially through the first annular bushing is articulable relative to the spherical bearing.

3. The adjustable mount as defined in claim 1, wherein the adjustable mount is operable to restrict movement of the engine accessory in three degrees of freedom.

4. The adjustable mount as defined in claim 1, wherein the first bracket is integrally formed with the engine accessory.

5. The adjustable mount as defined in claim 1, wherein the second bracket is removably fastened to the engine at the mounting location.

6. The adjustable mount as defined in claim 1, wherein the threaded stud is fully threaded along its length.

7. The adjustable mount as defined in claim 1, wherein the first annular bushing and the second annular bushing each include one or more seats along an outer circumference thereof.

8. A mounting system for mounting an engine accessory to an aircraft engine, comprising:
   a plurality of mounts coupling the engine accessory to respective mounting locations on the aircraft engine, at least one of the mounts including:

a first bracket adapted to be coupled to the engine accessory, the first bracket having a first bore disposed therethrough with a first annular bushing extending axially through the first bore, the first annular bushing having a radially outer surface rotatable within the first bore and a threaded radially inner surface;

a second bracket operatively coupled to the engine at a respective mounting location, the second bracket having a second bore disposed therethrough with a second annular bushing extending through the second bore, the second annular bushing having a radially outer surface rotatable within the second bore and a threaded radially inner surface;

a threaded stud extending axially through the first annular bushing and the second annular bushing, the threaded stud threadably engaged with the threaded radially inner surfaces of the first and second annular bushings, wherein rotation of the first annular bushing and/or the second annular bushing varies the relative axial positions of the first and second bushings on the threaded stud, and therefore adjusts an axial gap between the first and second brackets; and a first nut fastened to a first end of the threaded stud axially outward of the first bracket and a second nut fastened to a second end of the threaded stud axially outward of the second bracket, the first and second nuts axially retaining the adjustable mount together.

9. The mounting system as defined in claim 8, wherein the first bracket includes a spherical bearing disposed about the bore in the first bracket such that the threaded stud extending axially through the first annular bushing is articulable relative to the spherical bearing.

10. The mounting system as defined in claim 8, wherein the at least one of the mounts is operable to restrict movement of the engine accessory in three degrees of freedom.

11. The mounting system as defined in claim 8, wherein the first bracket is integrally formed with the engine accessory.

12. The mounting system as defined in claim 8, wherein the second bracket is removably fastenable to the engine at the respective mounting location.

13. The mounting system as defined in claim 8, wherein the threaded stud is fully threaded along its length.

14. The mounting system as defined in claim 8, wherein the first annular bushing and the second annular bushing each include one or more seats along an outer circumference thereof.

15. An adjustable mount for mounting an engine accessory to an aircraft engine at a mounting location thereon, the mount comprising:

a first bracket adapted to be coupled to the engine accessory, the first bracket having a first bore disposed therethrough with a first annular bushing extending axially through the first bore, the first annular bushing having a radially outer surface rotatable within the first bore and a threaded radially inner surface;

a second bracket operatively coupled to the engine at the mounting location, the second bracket having a second bore disposed at least partially therethrough;

a threaded stud extending axially through the first annular bushing and the second bore, a first end of the threaded stud threadably engaged with the threaded radially inner surface of the first annular bushing and a second end of the threaded stud operatively coupled to the second bore, wherein rotation of the first annular bushing varies the relative axial position of the first bushing on the threaded stud, and thereby adjusts an axial gap between the first and second brackets; and a first nut fastened to the first end of the threaded stud axially outward of the first bracket, the first nut axially retaining the adjustable mount together with the axial gap between the first and second brackets fixed.

16. The adjustable mount as defined in claim 15, wherein the second end of the threaded stud is rotatably received by corresponding threads in the second bore.

17. The adjustable mount as defined in claim 15, wherein the first bracket is integrally formed with the engine accessory.

18. The adjustable mount as defined in claim 15, wherein the second bracket is removably fastened to the engine at the mounting location.

19. The adjustable mount as defined in claim 15, wherein the first bracket is integrally formed with the engine accessory.

20. The adjustable mount as defined in claim 15, wherein the threaded stud is fully threaded along its length.

* * * * *